(12) United States Patent
Pinchen et al.

(10) Patent No.: US 8,297,523 B2
(45) Date of Patent: Oct. 30, 2012

(54) SECURE BARCODE

(75) Inventors: Stephen Paul Pinchen, Kirk Langley (GB); Jens Jacob Juul Rasmussen, Hellerup (DK)

(73) Assignee: Fracture Code Corporation Aps, Kastrup (DK)

( * ) Notice: Subject to any disclaimer, the term of this patent is extended or adjusted under 35 U.S.C. 154(b) by 135 days.

(21) Appl. No.: 12/024,652

(22) Filed: Feb. 1, 2008

(65) Prior Publication Data
US 2008/0185438 A1 Aug. 7, 2008

(30) Foreign Application Priority Data

Feb. 2, 2007 (GB) .................................. 0702091.0

(51) Int. Cl.
*G06K 7/10* (2006.01)
*G06K 19/06* (2006.01)
(52) U.S. Cl. .... 235/494; 235/375; 235/383; 235/462.01
(58) Field of Classification Search .................. 235/375, 235/383, 462.01–462.49, 487, 494, 492.09
See application file for complete search history.

(56) References Cited

U.S. PATENT DOCUMENTS

| 4,529,870 A | 7/1985 | Chaum |
| 4,972,476 A | 11/1990 | Nathans |
| 4,993,068 A | 2/1991 | Piosenka et al. |
| 5,176,405 A | 1/1993 | Kaule et al. |
| 5,354,097 A | 10/1994 | Tel |
| 5,488,664 A | 1/1996 | Shamir |
| 5,582,103 A | 12/1996 | Tanaka et al. |
| 5,606,609 A | 2/1997 | Houser et al. |
| 5,615,277 A | 3/1997 | Hoffman |
| 5,659,726 A | 8/1997 | Sandford, II et al. |
| 5,664,058 A | 9/1997 | Vysotsky |
| 5,680,460 A | 10/1997 | Tomko et al. |
| 5,687,236 A | 11/1997 | Moskowitz et al. |
| 5,695,220 A | 12/1997 | Phillips |
| 5,704,651 A | 1/1998 | Phillips |
| 5,712,912 A | 1/1998 | Tomko et al. |
| 5,719,939 A | 2/1998 | Tel |
| 5,719,950 A | 2/1998 | Osten et al. |
| 5,721,788 A | 2/1998 | Powell et al. |
| 5,734,752 A | 3/1998 | Knox |
| 5,742,685 A | 4/1998 | Berson et al. |
| 5,748,763 A | 5/1998 | Rhoads |
| 5,841,886 A | 11/1998 | Rhoads |

(Continued)

FOREIGN PATENT DOCUMENTS

GB 2383878 7/2003

(Continued)

OTHER PUBLICATIONS

Jian, K. Anil "Fundamentals of digital image processing." Prentice Hall, pp. 342-425 (1986).

(Continued)

*Primary Examiner* — Tuyen K Vo
(74) *Attorney, Agent, or Firm* — Banner & Witcoff, Ltd.

(57) ABSTRACT

A graphically represented, machine-readable code having a first abstract part and a second part comprises a contrived code having pre-associated data, wherein the first and second parts are associated electronically in a storage medium, such that the association is verifiable by a machine reading the code by reference to the storage medium, in order to authenticate the second part.

6 Claims, 9 Drawing Sheets

U.S. PATENT DOCUMENTS

| | | | |
|---|---|---|---|
| 6,389,151 | B1 | 5/2002 | Carr et al. |
| 6,729,603 | B1 * | 5/2004 | McQueen et al. ............ 235/375 |
| 6,748,533 | B1 | 6/2004 | Wu et al. |
| 7,182,259 | B2 * | 2/2007 | Lubow et al. ............ 235/462.01 |
| 7,267,280 | B2 * | 9/2007 | Lubow .................... 235/462.01 |
| 2003/0080191 | A1 | 5/2003 | Lubow et al. |
| 2003/0121984 | A1 * | 7/2003 | Pinchen et al. ............... 235/487 |
| 2005/0082376 | A1 * | 4/2005 | Lubow et al. ................. 235/494 |
| 2005/0199723 | A1 * | 9/2005 | Lubow .................... 235/462.01 |
| 2006/0095778 | A1 * | 5/2006 | He et al. ........................ 713/180 |

FOREIGN PATENT DOCUMENTS

WO      2005080088  A1     9/2005

OTHER PUBLICATIONS

Cox, I.J., et al. "Secure Spread Spectrum Watermarking for Multimedia." IEEE Trans on Image Processing 6, 12, 1673-1687 pp. 1-31 (1997).

Schneier, Bruce "Applied cryptography: protocols," Algorithms, and source code in C. John Wiley & Sons, Inc. pp. 461-500 (1996).

* cited by examiner

SECURE BARCODE

This application is a utility application which claims the priority of United Kingdom Patent Application No. GB 0702091.8, filed Feb. 2, 2007 incorporated herein by reference in its entirety.

BACKGROUND OF THE INVENTION

The present invention relates to codes and is concerned particularly with codes having two parts, which two parts are associated with each other.

Codes that are graphically represented and machine-readable are well-known. Such codes are commonly used on consumer goods and commercial products and when read may provide information relating to the cost, line item description, or origin of the product, for example. These types of codes may be used for automating check-outs at supermarkets, for stock control purposes or for verifying the correct product is in the correct packaging. More complex machine-readable codes of this type may be used as a security feature on certain consumer products such as pharmaceuticals, alcohol, tobacco and the like or for documents of high value such as currency, bonds, tax stamps, travel documents and identification cards to prevent counterfeiting, pass-off and diversion. There are a number of different types of code formats commonly in use; these include alphanumerics, linear barcodes and two-dimensional barcodes. Known barcodes include: Data Matrix, PDF-417, Micro-PDF-417, QR Code, MaxiCode, Codabar, RSS, EAN 128, UPC and Pharmacode. A major disadvantage of these types of code is the ease with which they may be copied. A further disadvantage is that a valid code may be guessed and constructed since the codes are based on algorithms which are in the public domain. Information which is encoded within the code can be derived, even if the data is encrypted, without reference to any database. The data may be used or manipulated for unauthorised purposes; this greatly reduces their effectiveness as a security device or track and trace device. The use of Data Matrix and PDF 417 codes as low cost track and trace devices is beginning to be trialled in some consumer goods sectors. They have a large enough data capacity to carry rudimentary information about the product history of the individual item, as well as its destination and customer details. However, their poor security will always limit their usefulness in the track and trace market.

One sophisticated type of machine-readable code is described in our UK Patent no GB 2383878 (the entire contents of which are incorporated herein by reference) and commercially available under the trademark FractureCode®. Advantages of this type of coding technology over other commercial machine-readable coding systems include the ability to generate a very high number of pseudo-random unique codes, making it impossible to guess the next code in the sequence. Another major advantage is that the code itself carries no data and no data is required to generate the code at the time the code is printed. This renders the code meaningless, or abstract, until the moment it is used.

Articles, such as consumer products or their packaging, are marked with such codes. In order to obtain information about the article the code must be read by a machine, which first performs a scanning operation to acquire digitally an image of the code. The image is then processed electronically to derive, via the application of an algorithm, a unique alphanumeric descriptor that may be used to look up data, which was previously associated with it, in a database.

The code is typically located on the surface of an article and comprises a unique graphical pattern, such as lines, dots or ellipses, with an area of this pattern delimited by a rectangular box, or some other boundary means, to form a code window.

It is particularly difficult to copy this code for a number a reasons. Firstly, it is difficult to reproduce the code with the degree of accuracy required, such that a reading machine would be unable to distinguish between the line position of an original code and that of a copy and would generate the same alphanumeric descriptor as would have been generated when scanning the original code. This feature is partly a function of the level of detail of the code. Secondly, many of the codes are no more than 1 mm by 1 mm in area and may be printed in ultraviolet inks, infrared inks or other covert security inks.

Although these types of code are very secure indeed, in some situations when they are used as a track and trace device they have a disadvantage when compared to barcodes in that data associated with the code can only be obtained by reference to a database. It is therefore desirable to provide a code which cannot be replicated and from which data can be directly derived.

BRIEF SUMMARY OF THE INVENTION

According to a first aspect of the present invention there is provided a graphically represented, machine-readable code having a first abstract part and a second part comprising a contrived code having pre-associated data, wherein the first and second parts are associated electronically in a storage medium, such that the association is verifiable by a machine reading the code by reference to the storage medium, in order to authenticate the second part.

The first part of the code may be at least a portion of a graphical indicium. The second part of the code may be a standard code such as a barcode. Alternatively, the second part of the code may be a numeric or alphanumeric code.

The portion of the graphical indicium may be delimited by a boundary which may be a temporary boundary that is generated by the machine reading the code relative to a fixed trigger point only when the code is being read.

According to a second aspect of the present invention there is provided a method of securing a two-part code comprising a first abstract part and a second part comprising a contrived code having pre-associated data, comprising the steps of: reading the first code part; reading the second code part; and, associating the first and second code parts on a storage means.

Reading the second code part may produce an alphanumeric character string.

The first code part may be at least a portion of a graphical indicium and the step of reading the first code part may comprise: acquiring electronically an image of at least a portion of the graphical indicium, and, processing the acquired image to produce a numeric or alphanumeric descriptor. Reading the first code part may further comprise creating a boundary which may be a temporary boundary around a portion of the graphical indicium relative to a fixed trigger point.

According to a third aspect of the present invention there is provided an apparatus for securing a two-part code comprising a first abstract part and a second part comprising a contrived code having pre-associated data, comprising: a reader for reading the first code part; a reader for reading the second code part; a storage means; and, an assignment unit for associating the first and second code parts on the storage means.

The apparatus may further include a decoder for converting the second code part to a numeric or alphanumeric character string.

The first code part may be at least a portion of a graphical indicium and the apparatus may further include: a camera for acquiring electronically an image of at least a portion of the graphical indicium, and a processor for processing the acquired image to produce a descriptor. The apparatus may further include: a window calculation unit for defining a portion of the graphical indicium to be processed by the processor; and, a detection unit for detecting a fixed trigger point for defining the position of the portion of the graphical indicium relative to it.

According to a fourth aspect of the present invention there is provided a method of authenticating a two-part code comprising a first abstract part and a second part comprising a contrived code having pre-associated data, comprising the steps of: reading the first code part; reading the second code part; and, checking if the first and second code parts are associated on a storage means.

Reading the second code part may produce a numeric or alphanumeric character string.

The first code part may be at least a portion of a graphical indicium and the step of reading the first code part may comprise: acquiring electronically an image of the a portion of the graphical indicium, and, processing the acquired image to produce a numeric or alphanumeric descriptor. Reading the first code part may further comprise creating a boundary which may be a temporary boundary around a portion of the graphical indicium relative to a fixed trigger point.

According to a fifth aspect of the present invention there is provided an apparatus for authenticating a two-part code comprising a first abstract part and a second part comprising a contrived code having pre-associated data, comprising: a reader for reading the first code part; a reader for reading the second code part; a storage means; and, an authentication unit for checking if the first and second code parts are associated on the storage means.

The apparatus may further include a decoder for converting the second code part to a numeric or alphanumeric character string.

The first code part may be at least a portion of a graphical indicium and the apparatus may further include: a camera for acquiring electronically an image of at least a portion of the graphical indicium, and a processor for processing the acquired image to produce a descriptor. The apparatus may further include: a window calculation unit for defining a portion of the graphical indicium to be processed by the processor; and, a detection unit for detecting a fixed trigger point for defining the position of the portion of the graphical indicium relative to it.

The contrived code may be according to a standard, such as any of the family of codes referred to as barcodes, but not limited thereto.

The invention may include any combination of the features and/or limitations referred to herein except combination of such features as are mutually exclusive.

BRIEF DESCRIPTION OF THE SEVERAL VIEWS OF THE DRAWINGS

Embodiments of the present invention will now be described, by way of example, with reference to the accompanying drawings, in which.

DETAILED DESCRIPTION OF THE INVENTION

Figure 1A:
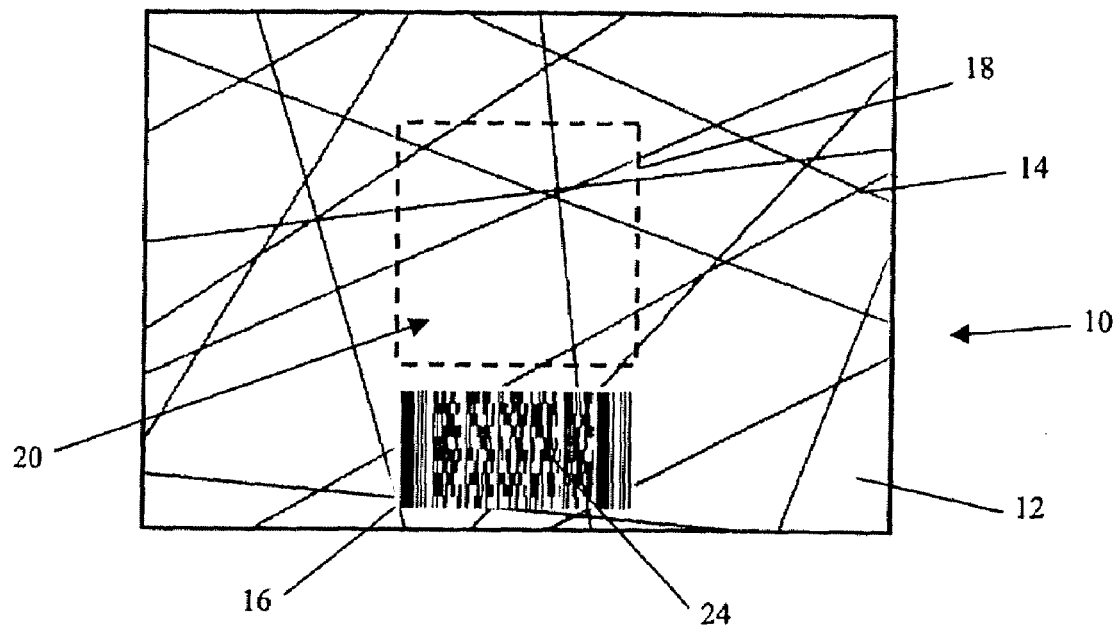
FIG. 1 shows a code according to a first embodiment of the invention.
Figure 1B:
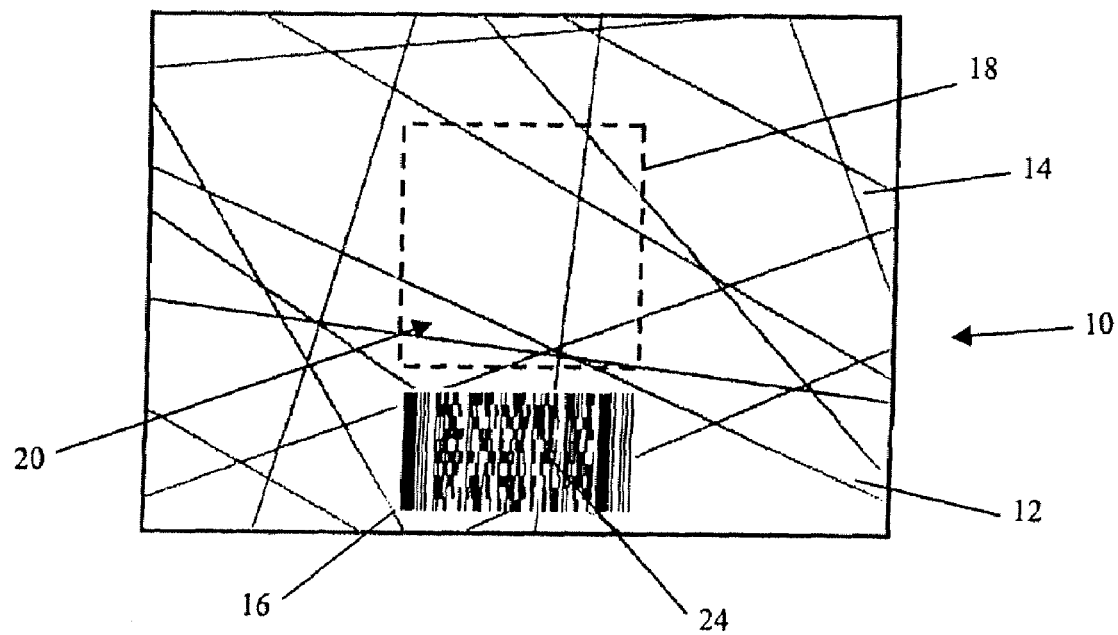

FIG. 1 shows an article 10 having a plurality of straight lines 14 printed over its surface 12. The lines are arranged at different angles such that at least some of the lines 14 intersect each other. The pattern of lines 14 varies continuously and every article 10 has a unique co-location of lines forming a graphical indicium on its surface 12. FIGS. 1a and 1b show different articles having different graphical indicia. Whilst the example is a plurality of intersecting lines, the code may comprise other elements or shapes such as dots, rectangles, ellipses or combinations of such elements and or shapes. At the time of printing, the lines 14 have no meaning whatsoever and no data or information is associated with them. Also printed on the surface 12 of the article 10 is a standard, contrived code which in this case is a barcode 24 in the form of PDF417 symbol. The barcode 24 contains alphanumeric data and when the barcode is read this data is decoded without reference to a database. The barcode 24 may contain information such as the date and time of manufacture, serial number and origin of an article in the form of "01/01/2007,1400, 731469821,LONDON" for example.

In order to secure the barcode against unauthorised reproduction the barcode data is associated with a portion of the code lines 14. To do this a window 18 must be defined which delimits a portion of the lines 14. The lines within the window must then be read, encoded and then assigned the data from the barcode.

Figure 2:
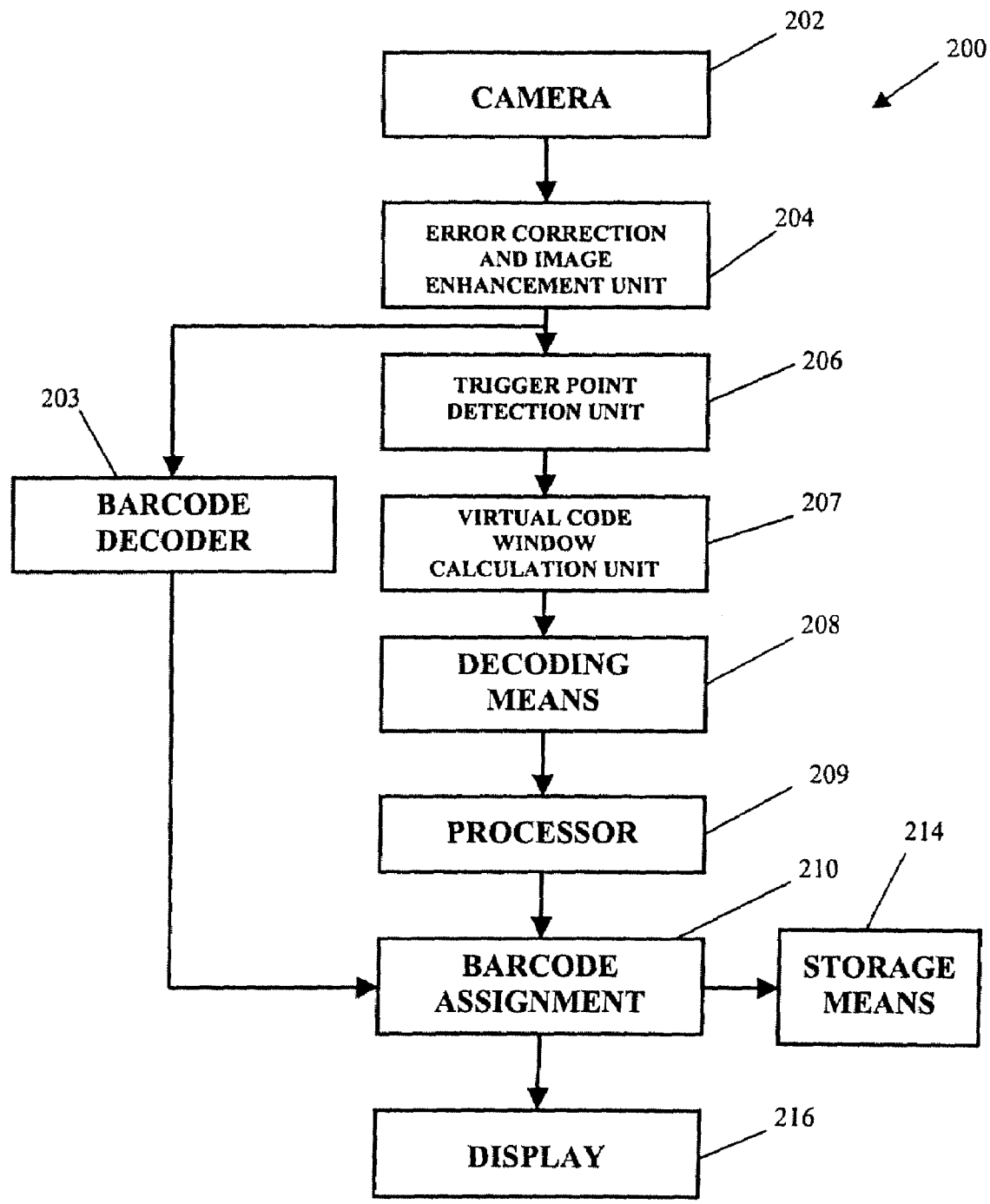
FIG. 2 shows schematically an apparatus for assigning data to a code according to a first embodiment of the invention.

FIG. 2 shows a schematic diagram of an apparatus 200 for reading the coding lines 14, encoding a portion of them and assigning barcode data thereto. A camera 202 acquires an image of the coding lines 14 and of the barcode 24. The acquired image is error-corrected and enhanced electronically in an error correction and image enhancement unit 204. The detection unit 206 then detects a pre-determined trigger point 16 The trigger point 16 in this example is the bottom left corner of the barcode 24 but may be the corner of the article 10, a mark or dot on the article 10 or any other machine-readable point. The trigger point 16 may be printed using either conventional inks or covert inks. Based on pre-defined co-ordinates, a virtual code window 18 of a specified size and shape is then created around a portion of the coding lines 14 relative to the trigger point 16 by a code window calculation unit 207. The co-ordinates of the virtual code window 18 relative to the trigger point 16 are defined by the machine 200 and the position of the virtual code window is therefore the same for every article 10 that is scanned. However, the pattern of the coding lines 14 within the virtual window 18 is unique for each article. The decoding means 208 then processes the code 20, which is the portion of the coding lines 14 delimited by the virtual code window 18, and the processor 209 applies an algorithm to produce an alphanumeric descriptor. A barcode decoder 203 decodes the barcode 24 to produce an alphanumeric character string. The alphanumeric descriptor of the code 20 is then assigned to the alphanumeric character string of the barcode 24 in a data assignment unit 210 and this association is stored in the storage means 214. As opposed to assigning the alphanumeric descriptor to the whole alphanumeric character string the alphanumeric descriptor may be assigned to a specific unique portion, such as a serial number, of the alphanumeric character string.

Alternatively, the alphanumeric character string is fed to the data assignment unit 210 where it is assigned to the descriptor. The association of the descriptor and the alphanumeric character string is then stored in the storage means 214. As opposed to associating the whole of the alphanumeric character string with the alphanumeric descriptor only a specific portion, such as the serial number, may be associated with it.

The alphanumeric descriptor and/or alphanumeric character string may be displayed on a display means 216.

Figure 3:
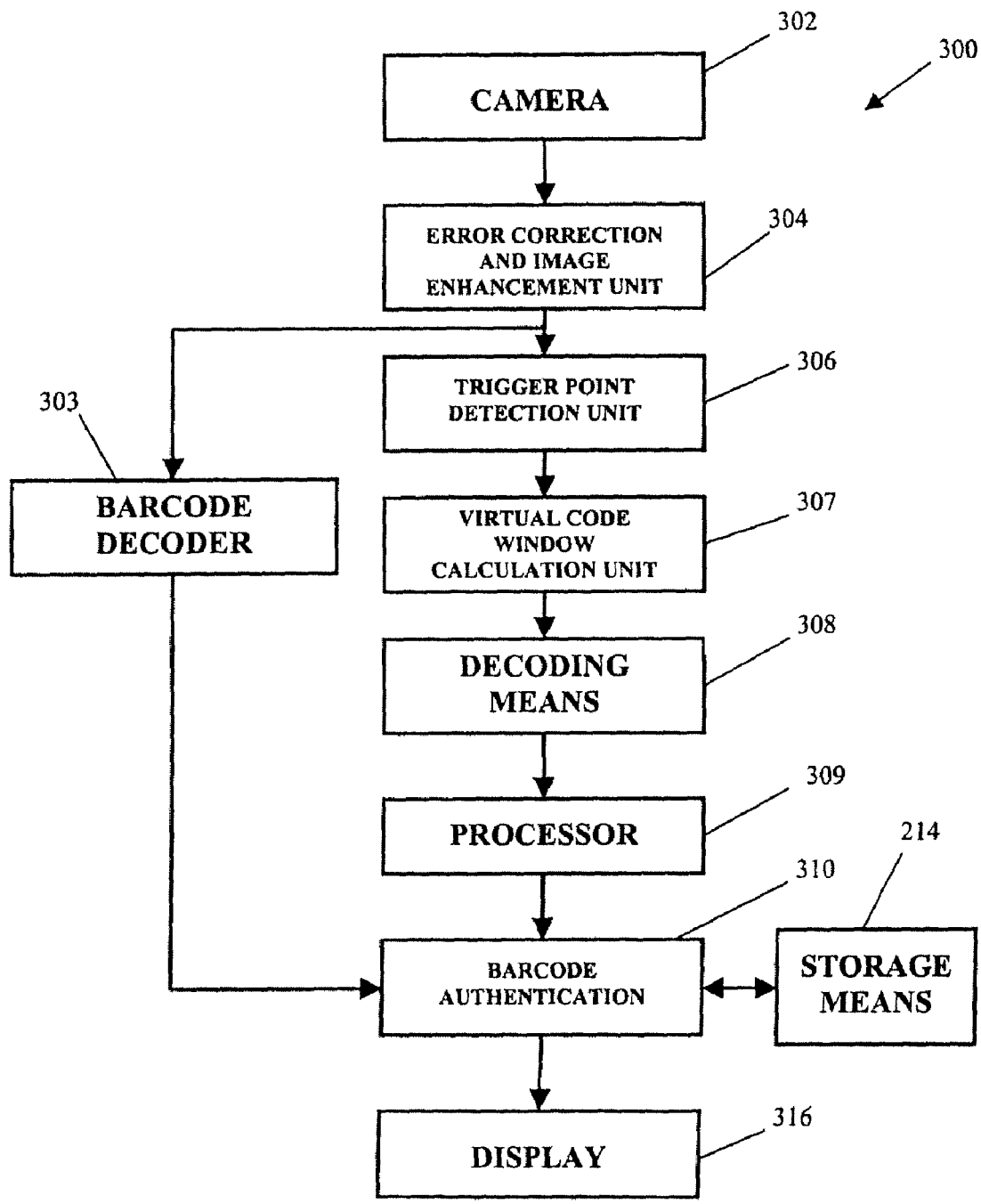
FIG. 3 shows schematically an apparatus for reading a code according to a first embodiment of the invention.

FIG. 3 schematically shows a hand-held reading apparatus 300 for reading and authenticating the barcode 24. A camera 302 acquires an image of the coding lines 14 and barcode 24 and which image is then error-corrected and enhanced electronically in an error correction and image enhancement unit 304. The detection unit 306 detects the pre-determined trigger point 16 and the window calculation unit 307 creates the virtual code window 18 of the specified shape and size based on pre-defined co-ordinates. The virtual code window 18 is in precisely the same position as when the article was initially scanned. The decoding means 308 then processes the code 20, which is the portion of the coding lines 14 delimited by the virtual code window 18, and the processor 309 applies an algorithm to produce the alphanumeric descriptor. A barcode decoder 303 decodes the barcode 24 to produce its alphanumeric character string. An authentication unit 310 then compares the pairing of the alphanumeric character string and the descriptor with pairings on the storage means 214 on which data was stored during the encoding process. If the same pairing can be found then the display means 316 indicates that the barcode 24 is authentic i.e. it remains within its original context. If the pairing cannot be found or if the reader 300 is not able to generate a descriptor, then the display means 316 indicates that the barcode 24 is "fake", in that it may be an unauthorised reproduction of a genuine barcode or else a barcode generated and applied illegally.

The benefit of this two-part code is that data can still be read from the barcode 24 directly without reference to a database as with any conventional barcode. However, the authenticity of the barcode 24 can be checked by scanning the code 20 and the barcode 24 and referring to a database. The code 20 therefore secures the barcode 24.

Counterfeiters wishing to forge the barcode 24 must also copy the code 20 to ensure that its authenticity will be verified when scanned. The code 20 is extremely difficult to copy due to the level of detail required to produce the same alphanumeric descriptor on application of the algorithm. Further, since it is not immediately obvious where on the substrate 12 the code portion 20 is located, the whole of the graphical indicium 14 must be reproduced.

If the next barcode 24 in a series is generated and applied, then upon checking the authenticity of the barcode either no code 20 will be found or the code 20 will be incorrect depending upon whether or not a graphical indicium 14 has also be reproduced. This is because there is no way of knowing what the code 20 paired with any particular barcode 24 is. The chance of guessing the correct pairing of barcode 24 and code 20 is extremely small.

Further, a would-be counterfeiter might not even realise there is a graphical indicium 14 over the surface 12 of the article 10 since it may be printed using a covert ink.

Figure 4A:
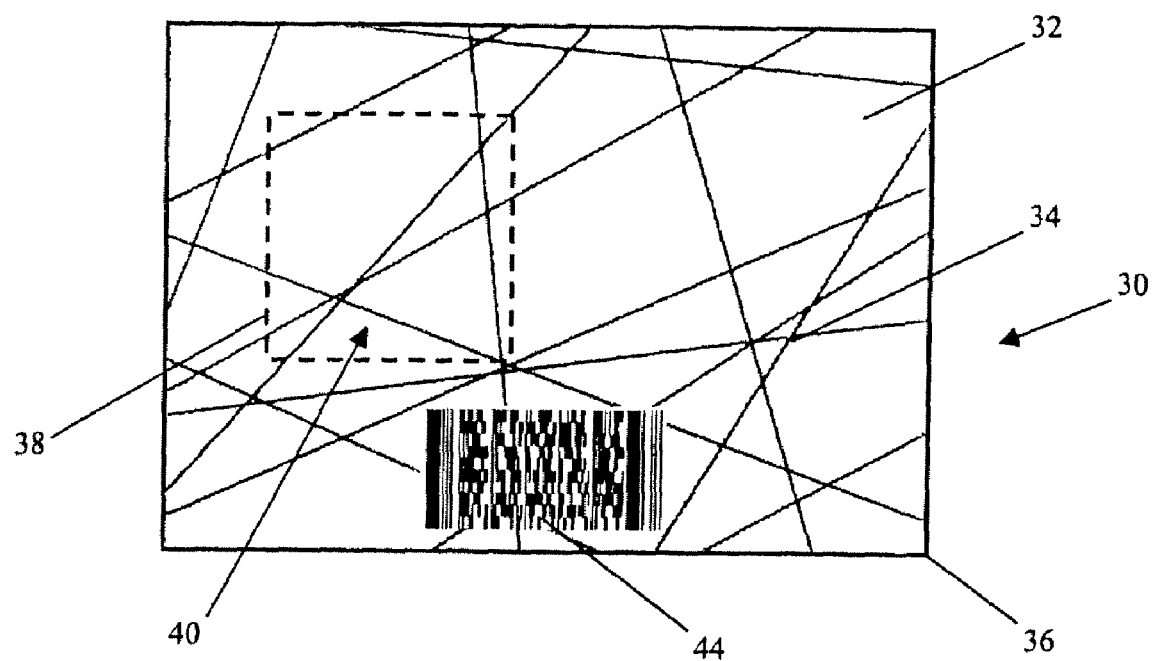
FIG. 4 shows a code according to the second embodiment of the invention.
Figure 4B:
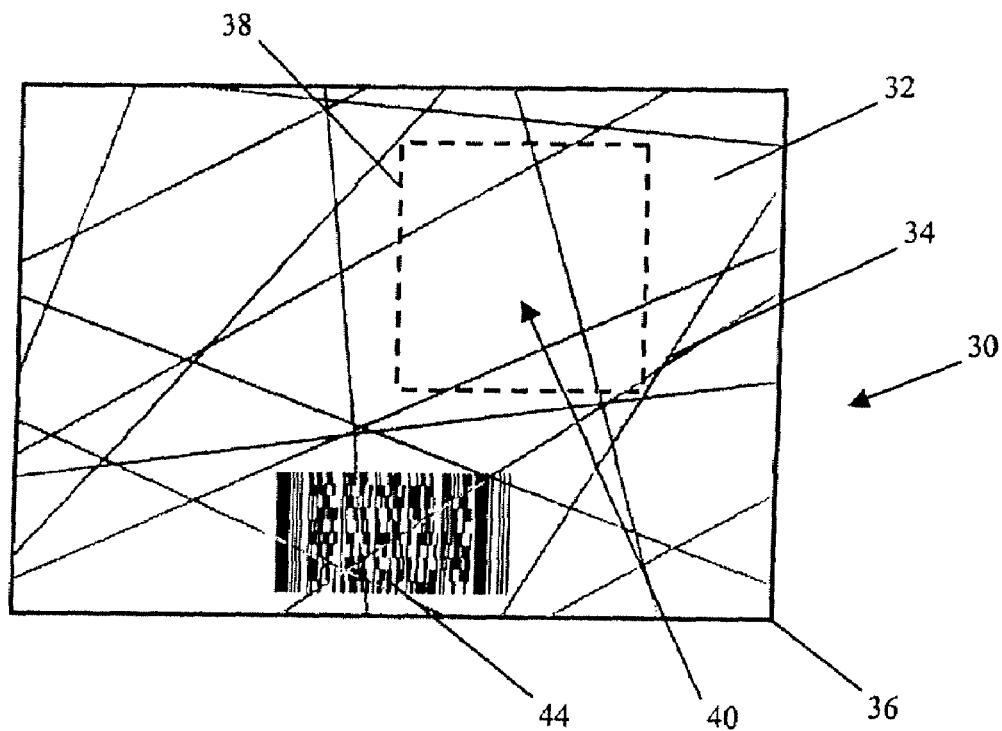

A second embodiment of the invention is shown in FIG. 4. An article 30 has a plurality of straight lines 34 printed over its surface 32 which are arranged at different angles such that at least some of the lines intersect each other. The pattern of coding lines 34 over the surface 32 is fixed for each article 30 and therefore every article in a series has the same pattern of lines on its surface. When the coding lines 34 are printed they have no meaning. Also printed on the surface 32 of the article 30 is a barcode 44 in the form of a PDF417 symbol. The barcode 44 contains alphanumeric data and can be decoded without reference to a database. As well as the barcode 44 containing information such as date, time, serial number and origin, it contains the co-ordinates of a virtual code window 38 relative to a trigger point 36. The trigger point 36 in this example is the bottom right-hand corner of the article. The coding lines 34 and/or barcode 44 may be printed using either conventional inks or covert inks, such as are detectable only when illuminated, or irradiated, with light of a certain frequency range. The co-ordinates of the virtual code window 38 are arranged to be different for each article 30 in a series of articles. Thus the code 40, delimited by the virtual code window 38, is unique for each article in the series.

Not only would an intending counterfeiter need to know the co-ordinates of the window and the trigger point, he would also have to be able to reproduce the lines of the code within the window very precisely.

Figure 5:
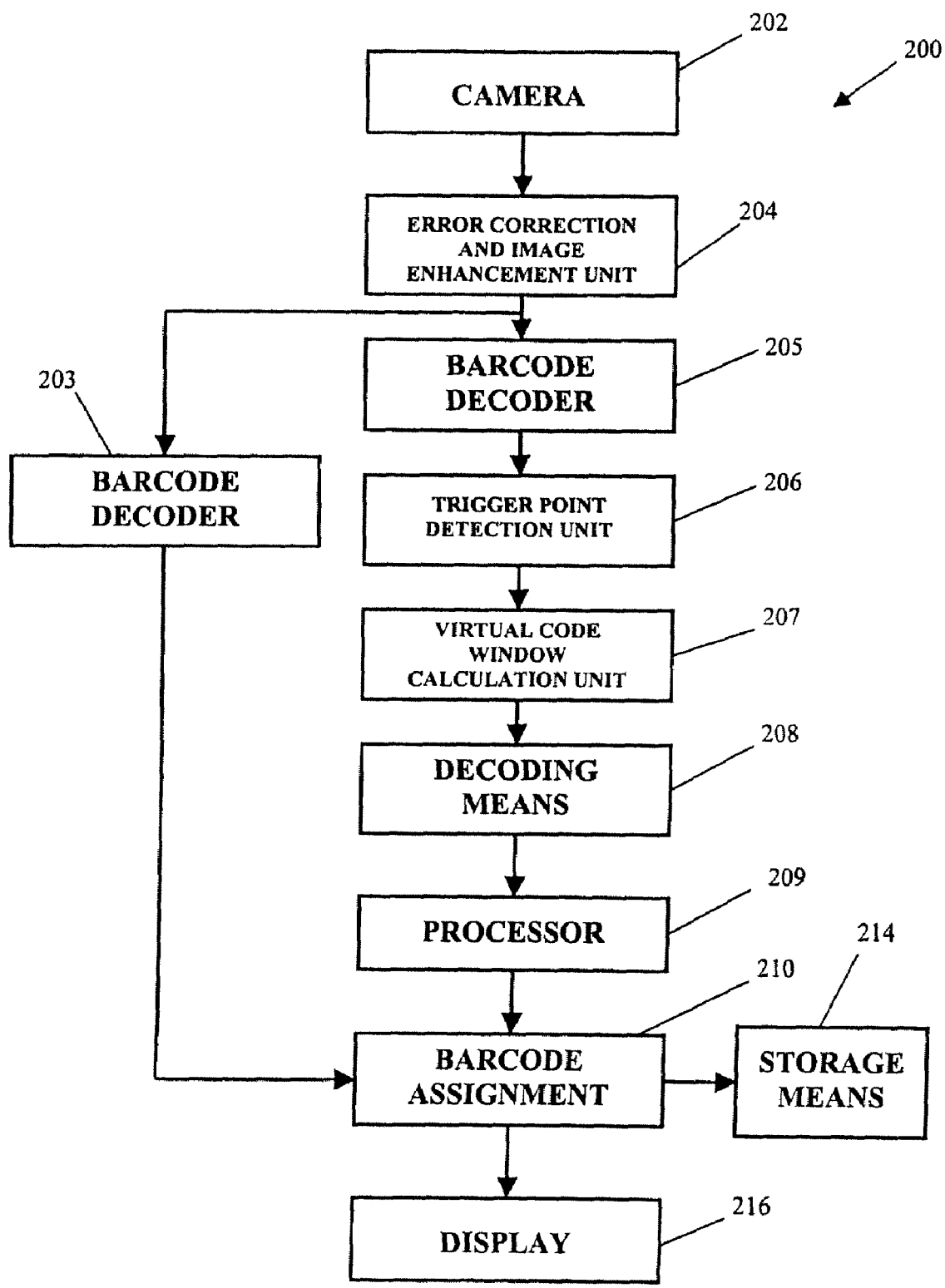
FIG. 5 shows schematically an apparatus for assigning data to a code according to a second embodiment of the invention.

FIG. 5 is a schematic diagram of an apparatus 200 for reading the barcode 44 and the coding lines 34, encoding a portion 40 of the coding lines and assigning the barcode 44 data thereto. This is the same as the apparatus shown in FIG. 2 except a second barcode decoder 205 provides the co-ordinates of the virtual code window 38. The alphanumeric character string 46 contained in barcode 44 is associated with the code 40 in the same way as for the first embodiment except the co-ordinates of the virtual code window 38 are determined by reading the barcode 44 on the article.

Figure 6:
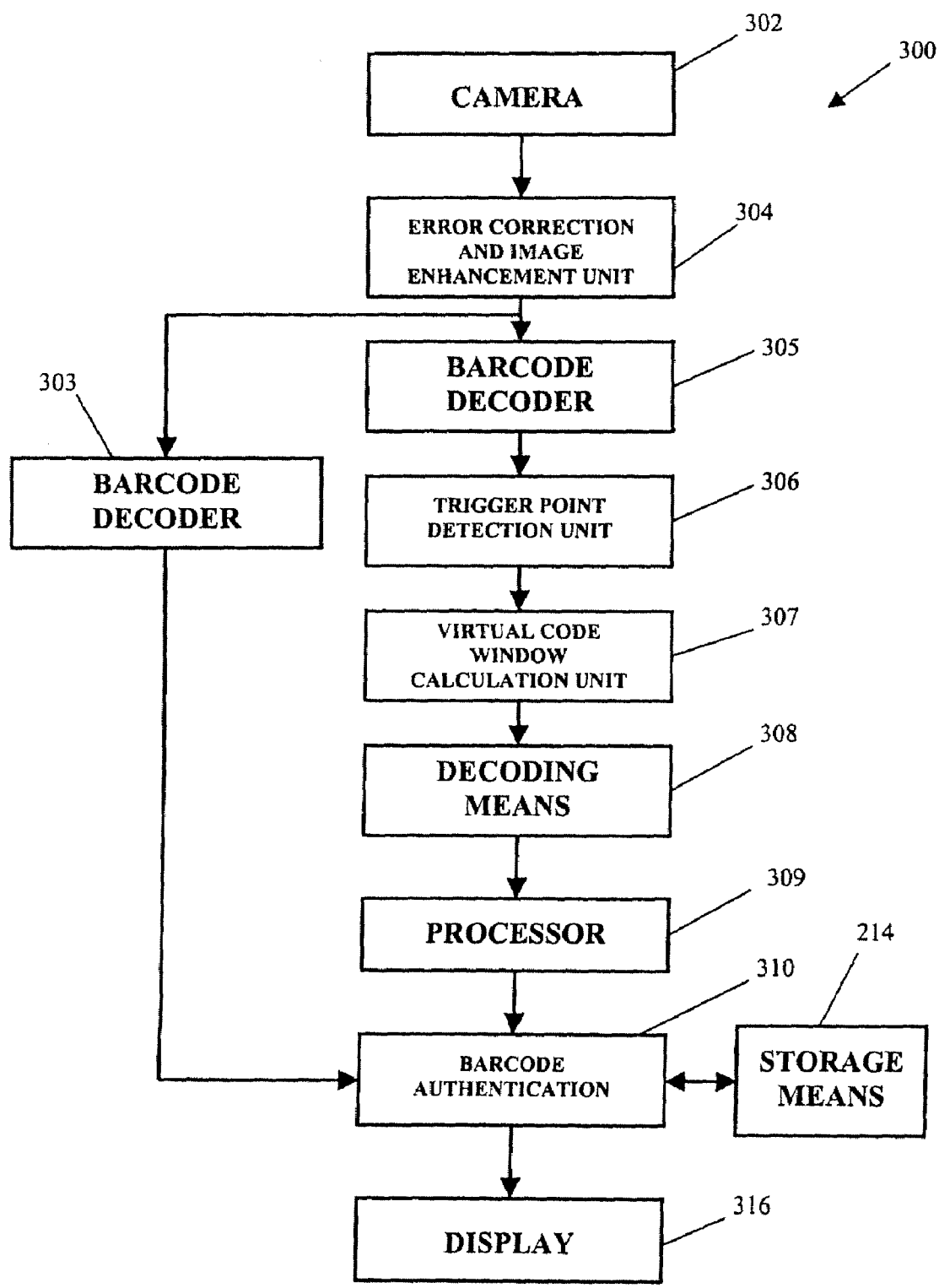
FIG. 6 shows schematically an apparatus for reading a code according to a second embodiment of the invention.

FIG. 6 schematically shows a hand-held reading apparatus 300 for verifying the authenticity, or otherwise, of the barcode 44. This is the same as the apparatus shown in FIG. 3 except a second barcode decoder 305 extracts the co-ordinates of the virtual code window 38 from the barcode 44. The method for authenticating the barcode 44 is the same as for the first embodiment except the barcode decoder 305 determines the co-ordinates of the virtual code window 38 relative to the trigger point 36.

Figure 7A:
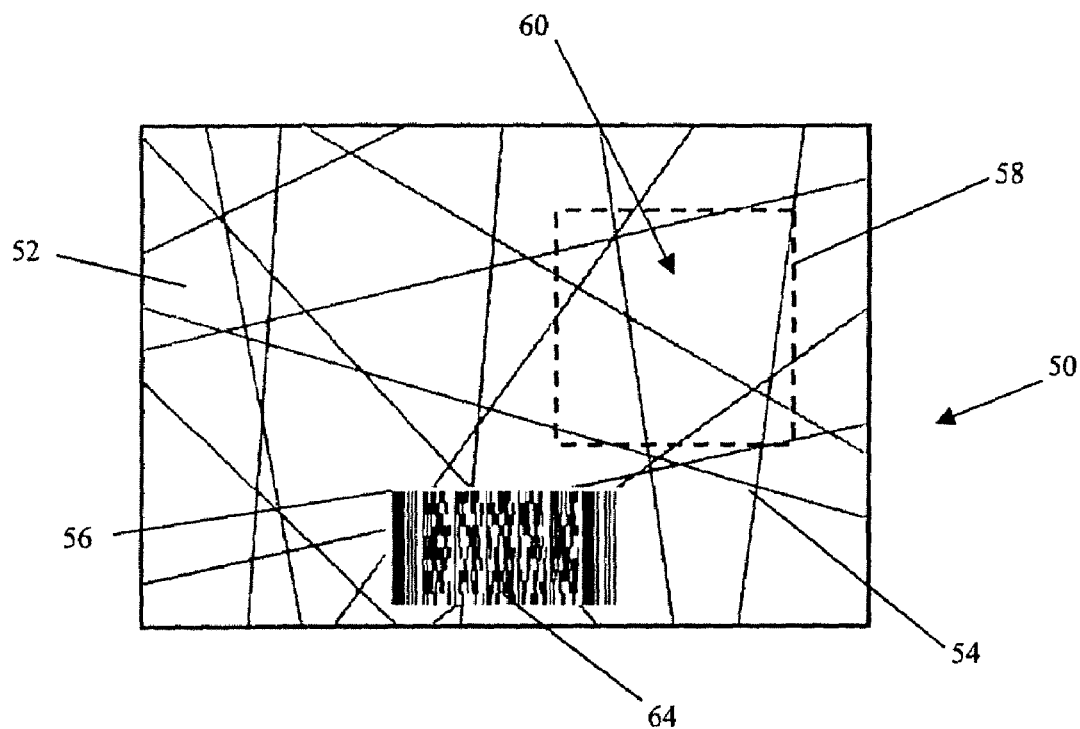
FIG. 7 shows a code according to the third embodiment of the invention.
Figure 7B:
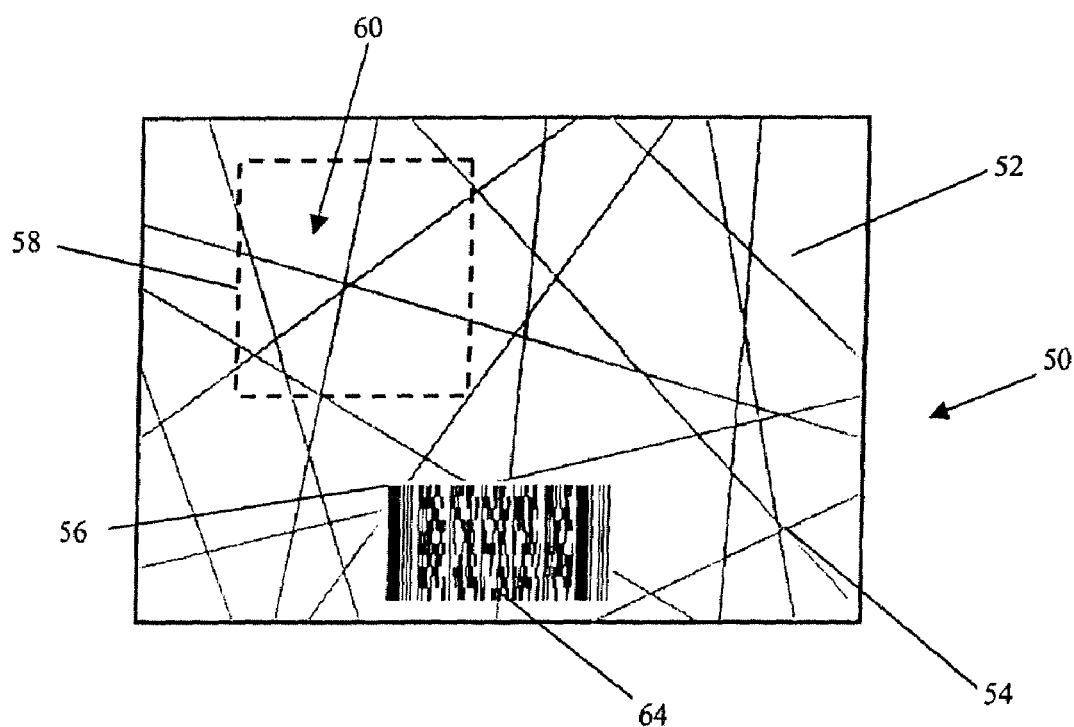

FIG. 7 illustrates a third embodiment of the invention. This is the same as the second embodiment except coding lines 54 located on a substrate 52 vary continuously and therefore the portion of coding lines 54 within any delimited portion of the substrate is unique. A barcode 64 is also located on the substrate which, amongst other things, contains information as to the location of a virtual code window 58, which defines a code 60, relative to a trigger point 56. The trigger point 56 in this embodiment is the top left-hand corner of the barcode 64. The code 60 may be assigned the alphanumeric character string contained in the barcode 64 by the apparatus as shown in FIG. 5 and as described for the second embodiment. The code 60 may be read using the apparatus shown in FIG. 6 and as described for the second embodiment.

Figure 8A:
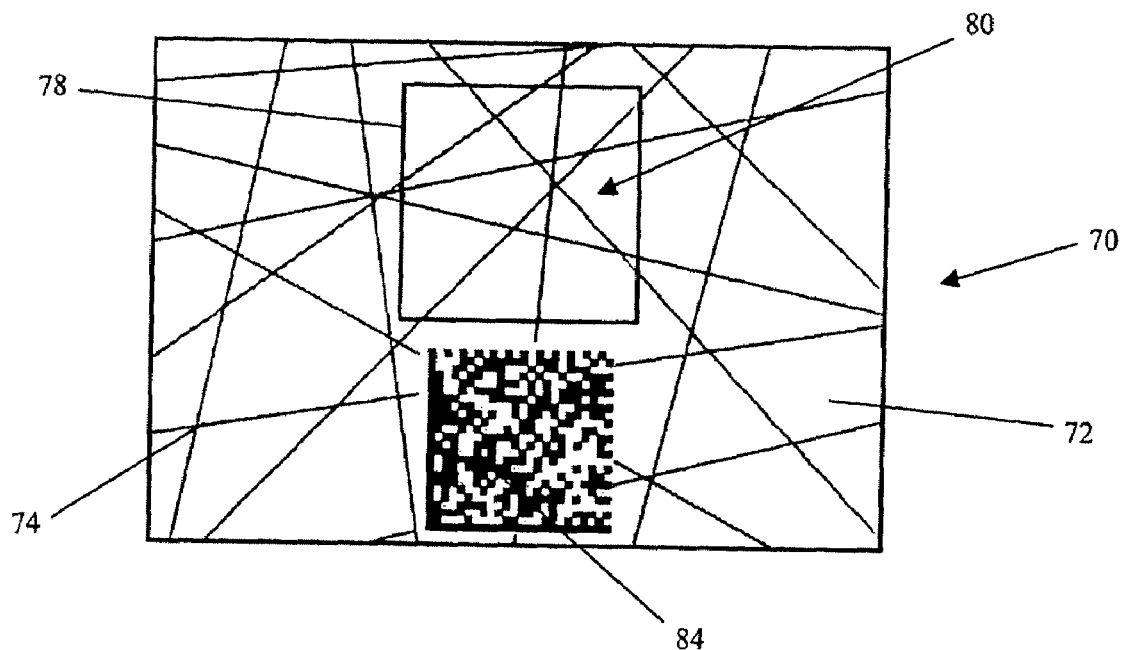
FIG. 8 shows a code according to the fourth embodiment of the invention.
Figure 8B:
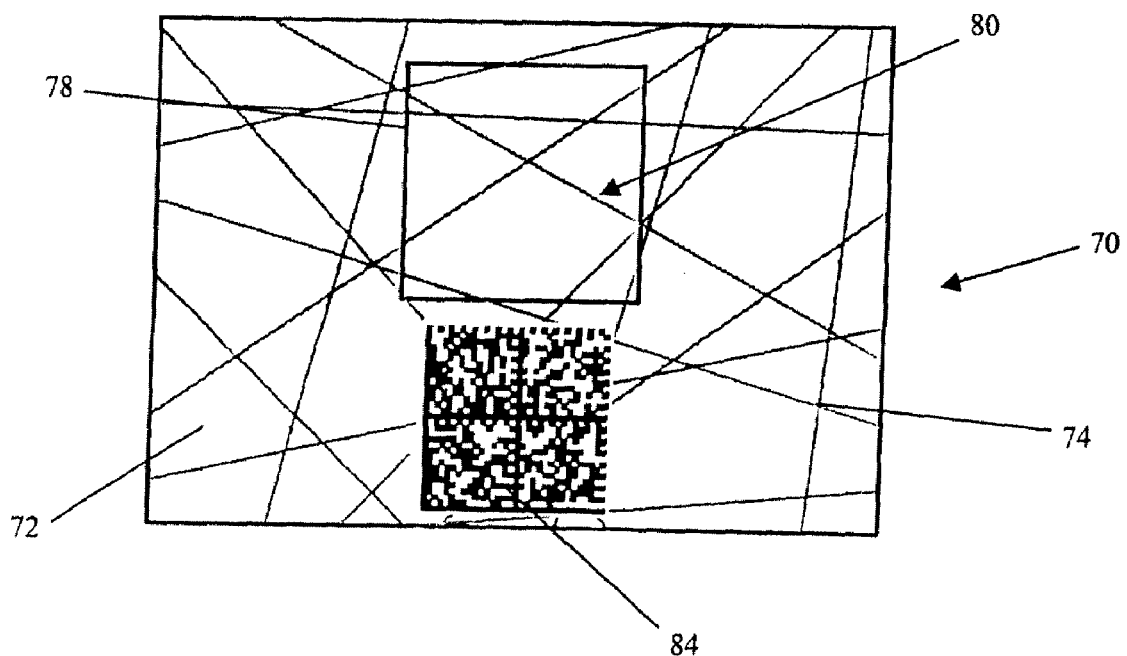

A fourth embodiment of the invention is illustrated in FIG. 8. This is essentially the same as the first embodiment except that a code window 78, which delimits a code 80, is graphically represented and there is no trigger point. The barcode 84 in this example is a DataMatrix™ code. The code 80 may be assigned the alphanumeric character string contained in a barcode 84 by the apparatus as shown in FIG. 2 and as described for the first embodiment. The difference is that the processor 202 visually detects the code window 78 as opposed to it being defined by the machine relative to a fixed trigger point. The code 80 may be read using the apparatus shown in FIG. 6 and as described for the first embodiment. Again, the only difference is that the machine visually detects the code window 78.

Figure 9:
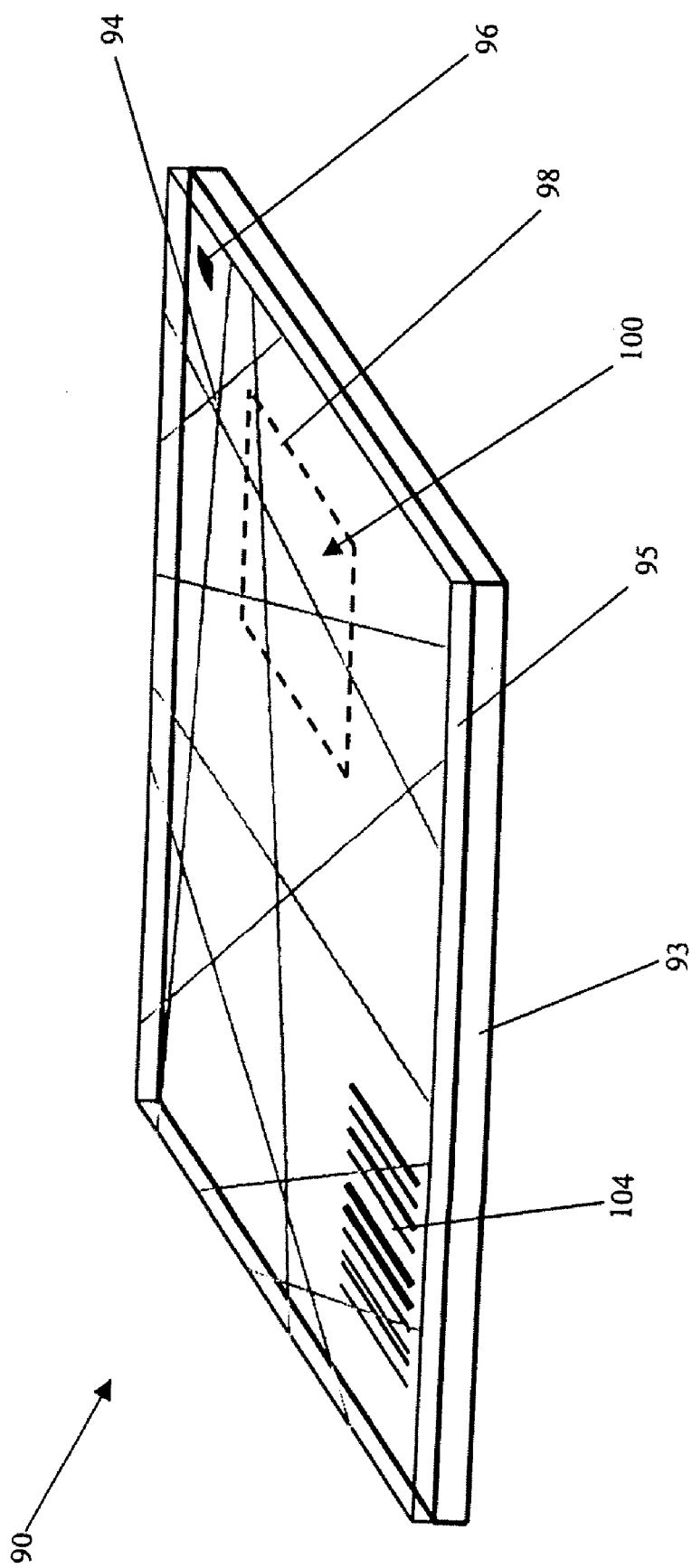
FIG. 9 shows a code according to the fifth embodiment of the invention.

FIG. 9 shows a fifth embodiment of the invention. This is essentially the same as the third embodiment except that the article 90 comprises a substrate 93 overlaid by a transparent laminate layer 95. Coding lines 94 are located on the laminate 95 and a barcode 104 together with a trigger point 96 are located on the substrate 93. If the article 90 is tampered with and the laminate 95 and substrate 93 are separated or damaged then the code will not be authenticable since the relative position of the trigger point 96 and coding lines 94 will have changed, and the portion of coding lines 96 within the virtual code window 98, defined relative to the trigger point 96, will have changed, resulting in an unrecognised alphanumeric descriptor.

As an alternative to using an ink-printed or ink-sprayed graphical indicium, the graphical indicium may comprise a random arrangement of fibres within a substrate. Such fibres may be incorporated into the substrate during the manufacture process and may be coloured or UV sensitive.

The inks used in the processes described above may be tagged inks which may comprise luminescent and/or phosphorescent compounds or filters such as UV blockers.

The invention claimed is:

1. A method of securing a barcode and subsequently authenticating a barcode, the method comprising the steps of:
   (A) printing a two-part code comprising a first unique abstract part and a second part comprising a barcode containing alphanumeric data which is to be secured;
   (B) securing the barcodes by reading the first part and applying an algorithm to produce a descriptor, reading the second part comprising the barcode and decoding it to produce the alphanumeric data which it contains, and associating the first and second parts on a storage means by pairing the descriptor with at least part of the alphanumeric data contained in the barcode; and
   (C) subsequently authenticating a barcode of a two-part code by: reading the first part and applying an algorithm to produce a descriptor, reading the second part comprising the barcode and decoding it to produce the alphanumeric data which it contains, checking if the first and second parts are associated on the storage means by comparing the pairing of the descriptor and the alphanumeric data with pairings on the storage means, and indicating that the barcode is authentic if the same pairing can be found, or indicating that the barcode is fake if the pairing cannot be found.

2. A method according to claim 1, wherein the first part is at least a portion of a graphical indicium and the step of reading the first part comprises:
   acquiring electronically an image of at least a portion of the graphical indicium; and
   processing the acquired image to produce a descriptor.

3. A method according to claim 2, wherein reading the first part further comprises creating a temporary boundary around a portion of the graphical indicium relative to a fixed trigger point.

4. An apparatus for authenticating a barcode of a two-part code comprising a first unique abstract part and a second part comprising a barcode containing alphanumeric data which is to be secured, wherein the first and second parts are printed, the apparatus comprising:
   a reader for reading the first part and for reading the second part comprising the barcode;
   a decoder for converting the first part to a descriptor by applying an algorithm;
   a decoder for converting the second part comprising the barcode to the alphanumeric data which it contains;
   a storage means;
   an authentication unit for checking if the first and second parts are associated on the storage means by comparing the pairing of the descriptor and the alphanumeric data with pairings on the storage means; and
   means for indicating that the barcode is authentic if the same pairing can be found, or indicating that the barcode is fake if the pairing cannot be found.

5. An apparatus according to claim 4, wherein the first part is at least a portion of a graphical indicium and the apparatus further comprises:
   a camera for acquiring electronically an image of at least a portion of the graphical indicium, and
   a processor for processing the acquired image to produce a descriptor.

6. An apparatus according to claim 5, further comprising:
   a window calculation unit for defining a portion of the graphical indicium to be processed by the processor; and
   a detection unit for detecting a fixed trigger point for defining the position of the portion of the graphical indicium relative to it.

\* \* \* \* \*